US010554608B2

(12) United States Patent
Murali et al.

(10) Patent No.: US 10,554,608 B2
(45) Date of Patent: Feb. 4, 2020

(54) METHOD AND SYSTEM FOR DISPLAYING EMAIL MESSAGES

(71) Applicant: OATH INC., New York, NY (US)

(72) Inventors: Subramanyan Murali, Sunnyvale, CA (US); Ankit Shah, Sunnyvale, CA (US)

(73) Assignee: OATH INC., New York, NY (US)

( * ) Notice: Subject to any disclaimer, the term of this patent is extended or adjusted under 35 U.S.C. 154(b) by 217 days.

(21) Appl. No.: 13/780,922

(22) Filed: Feb. 28, 2013

(65) Prior Publication Data
US 2014/0245176 A1    Aug. 28, 2014

(51) Int. Cl.
G06Q 10/10      (2012.01)
G06F 3/0481     (2013.01)
G06F 3/0483     (2013.01)
H04L 12/58      (2006.01)

(52) U.S. Cl.
CPC ............ H04L 51/22 (2013.01); G06F 3/0481 (2013.01); G06F 3/0483 (2013.01); G06F 3/04817 (2013.01); G06Q 10/107 (2013.01)

(58) Field of Classification Search
CPC ..... G06Q 10/107; H04L 51/22; G06F 3/0481; G06F 3/04817; G06F 3/0483
USPC ........................................................ 715/752
See application file for complete search history.

(56) References Cited

U.S. PATENT DOCUMENTS

| | | | | |
|---|---|---|---|---|
| 7,290,033 B1* | 10/2007 | Goldman | ................ | H04L 51/12 709/206 |
| 8,073,910 B2* | 12/2011 | Tokuda | ................ | G06Q 10/107 709/206 |
| 8,150,930 B2* | 4/2012 | Satterfield | ............. | G06F 3/0481 709/206 |
| 8,311,562 B2* | 11/2012 | Klassen | ........................ | 455/466 |
| 8,375,307 B2* | 2/2013 | Kim | ..................... | G06Q 10/107 709/206 |
| 2005/0267944 A1* | 12/2005 | Little, II | .............. | G06Q 10/107 709/207 |
| 2006/0065708 A1* | 3/2006 | Kanatani | ............... | G06F 17/212 235/375 |
| 2007/0162394 A1* | 7/2007 | Zager | .................... | G06Q 20/04 705/51 |
| 2008/0104186 A1* | 5/2008 | Wieneke | .............. | G06Q 10/107 709/206 |
| 2010/0042684 A1* | 2/2010 | Broms | .................. | G06F 3/0483 709/204 |
| 2010/0211872 A1* | 8/2010 | Rolston et al. | ............... | 715/702 |
| 2011/0072363 A1* | 3/2011 | Mandel | ................ | G06Q 10/107 715/752 |
| 2012/0036443 A1* | 2/2012 | Ohmori et al. | ............... | 715/736 |
| 2013/0024779 A1* | 1/2013 | Bechtel et al. | ............... | 715/752 |

(Continued)

Primary Examiner — Kieu D Vu
Assistant Examiner — Blaine T. Basom
(74) Attorney, Agent, or Firm — James J. DeCarlo; Greenberg Traurig, LLP

(57) ABSTRACT

A computing device and method for displaying content such as email messages in a user interface including email message cards. Email messages in an email mailbox are accessed. The email messages are configured into a graphical display format, where the display format includes email message cards, each email message card representing a respective email message in the mailbox and including a portion of email contents of the email message. The graphical display format is communicated to a display device for display of the configured message cards.

12 Claims, 14 Drawing Sheets

(56) References Cited

U.S. PATENT DOCUMENTS

2014/0137020 A1* 5/2014 Sharma ................ G06F 3/0482
                                                    715/769
2014/0173457 A1* 6/2014 Wang et al. .................. 715/752
2014/0245174 A1* 8/2014 Rydenhag ............. G06Q 30/02
                                                    715/752

* cited by examiner

METHOD AND SYSTEM FOR DISPLAYING EMAIL MESSAGES

FIELD

The present disclosure relates to a user interface, and more specifically to displaying email messages in a user interface displayed by a computing device.

BACKGROUND

Traditionally, email messages are displayed as sequential lists. The email messages can be sorted by one of a variety of criteria, such as date received, subject, sender, size, importance, or flag status. To read an email message, one often has to use his mouse to quickly click on the message twice (i.e., a double-click) in the list to open a message read screen. One can also use a preview screen, which displays the contents of the email message after the user clicks on the message once. With certain devices such as smartphones and tablets, the user can open an email message by pressing on the message with the user's finger.

SUMMARY

A user interface that displays email messages as email message cards is disclosed. This user interface facilitates rapid review of email messages, sorting of email messages, grouping of email messages, and performing actions related to email messages.

In one aspect, a method and computing device display email messages in a user interface including email message cards. An email mailbox module or logic executed by the computing device accesses email messages in an email mailbox. An email mailbox configuring module or logic executed by the processor configures the email messages in the email mailbox into a graphical display format, where the display format includes email message cards. Each email message card represents a respective email message in the mailbox and includes at least some email contents of the email message. A communication module or logic executed by the processor communicates the graphical display format to a display device for display of the configured message cards.

In one embodiment, the computing device includes the display device. In another embodiment, the communication logic communicates to a remote device (e.g., smartphone, tablet, etc.) including the display device. The computing device can also include email sender detection logic for detecting a domain of an email message and associating a domain identifier icon to an email message card associated with the email message. In one embodiment, each email message card includes sender information, a subject line, and/or a selection state.

The computing device can additionally include user configuration receiving logic executed by the processor for receiving a user configuration of an email message card. In one embodiment, the computing device detects a pagination command which causes display of different email message cards. In one embodiment, the email mailbox configuring logic includes stack configuring logic executed by the processor for configuring the email messages in the email mailbox into a graphical display format, the display format including email message cards arranged in a stack configuration. Action performing logic executed by the processor can perform an action on an email message card in response to receiving input from a user operating the display device.

The user interface can be switched on via a received enablement signal (e.g., the user selects a button on a web page) to enable the graphical display format. The user interface can similarly be switched off via a received disablement signal (e.g., the user selects the same or a different button on the web page).

In another aspect, a computing device displays content such as web pages, software documents (e.g., spreadsheets or word processing documents), etc. in this user interface. A plurality of software content is accessed by content accessing logic, and content configuring logic configures the plurality of software content into a graphical display format that includes software cards. Each software card represents a respective software content and includes a portion of information in the respective software content. Communication logic communicates the graphical display format to a display device for display of the configured cards.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
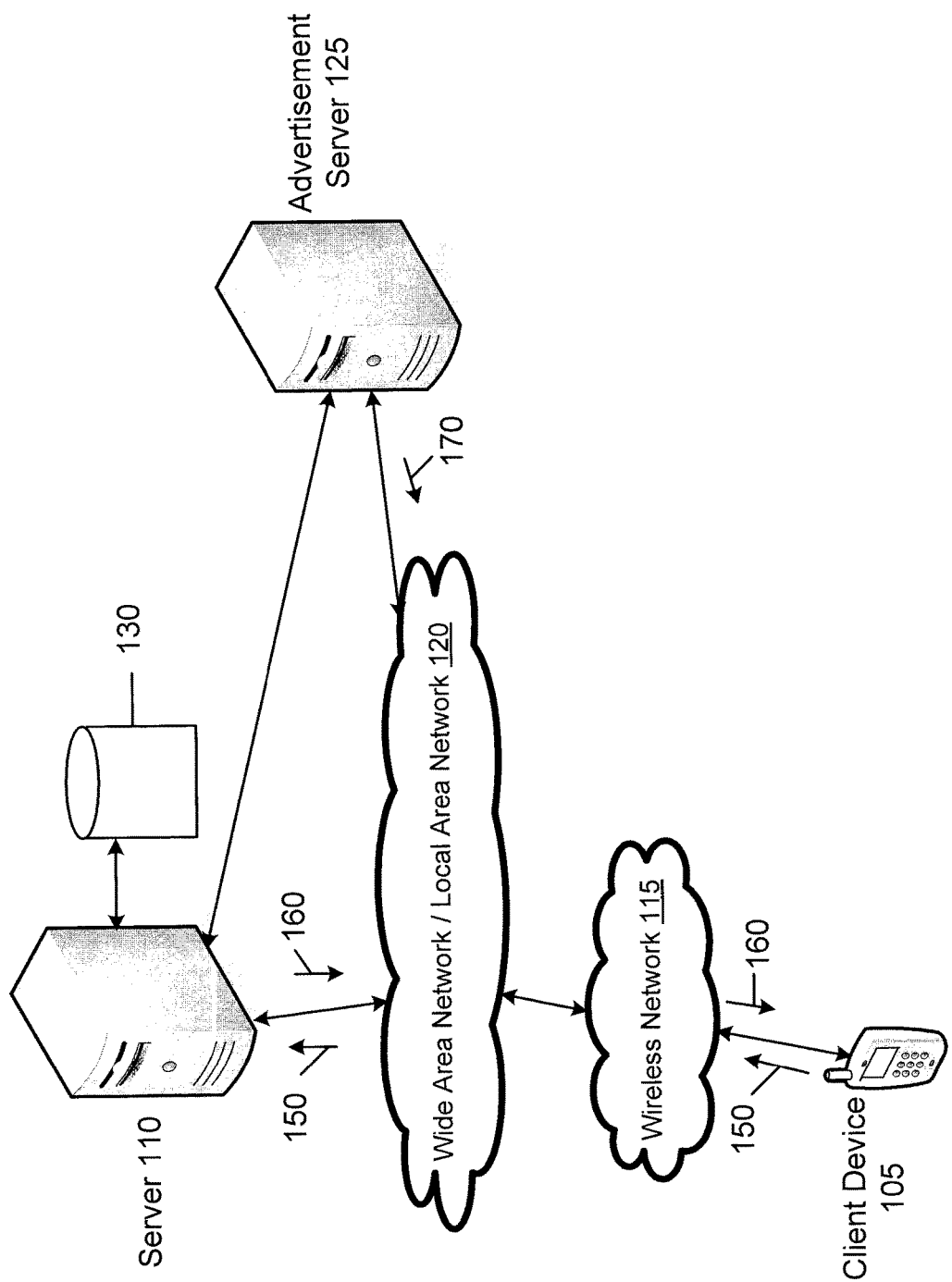
FIG. 1 is a block diagram of a client device communicating over a network with a server computer in accordance with an embodiment of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The present disclosure is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

FIG. 1 is a schematic diagram illustrating an example embodiment of a network and devices implementing embodiments of the present disclosure. Other embodiments that may vary, for example, in terms of arrangement or in terms of type of components, are also intended to be included within claimed subject matter. FIG. 1 includes, for example, a client device 105 in communication with a server 110 over a wireless network 115 connected to a local area network (LAN)/wide area network (WAN) 120, such as the Internet. In one embodiment, the client device 105 is also in communication with an advertisement server 125. In another embodiment, the server 110 is in communication with the advertisement server 125. Although shown as a wireless network 115 and WAN/LAN 120, the client device 105 can communicate with servers 110, 125 via any type of network.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows® Server, Mac® OS X®, Unix®, Linux®, FreeBSD®, or the like.

Server 110 may include a device that includes a configuration to provide content via a network to another device. A server 110 may, for example, host a site, such as Yahoo!®'s web site. A server 110 may also host a variety of other sites, including, but not limited to, business sites, social networking sites, educational sites, dictionary sites, encyclopedia sites, wikis, financial sites, government sites, personal sites, etc.

Server 110 may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as a server include desktop computers, multiprocessor systems, microprocessor-type or programmable consumer electronics, etc.

In one embodiment, the server 110 hosts or is in communication with a database 130. The database 130 may be stored locally or remotely from the server 110.

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

In one embodiment and as described herein, the client device 105 is a smartphone. In another embodiment, the client device 105 is a tablet. In another embodiment, the client device 105 is a computer, a laptop, a set top box, etc.

In one embodiment, a user of the client device 105 accesses his or her personal email on a site hosted by server computer 110. For example, the user logs into the user's account or creates an account on the server 110. In one embodiment, the user uses the client computer 105 to transmit a request 150 to access the user's email mailbox on the server 110. The server 110 receives the request and provides an email mailbox user interface to the user via a display device (e.g., on the client device 105). Typically, the email mailbox user interface displays the email messages in a list format in the form of the well known "in-box" email listing, which displays email headers, usually by date and time of receipt, and the sender and subject.

In one embodiment, the email mailbox user interface displays the email messages in a user interface (also referred to herein as a graphical display format), where the display format includes email message cards, as opposed to, or in addition to, the known header listing. An email message card represents an email message in the mailbox and includes a portion of the email content of the email message. In one embodiment, the server 110 transmits this email mailbox user interface 160 with email message cards to the client device 105 for display to the user.

In one embodiment, the advertisement server 125 serves one or more advertisements 170 to the client device 105. The advertisements 170 can be related to the emails displayed as email message cards, such as being related to the subject or the contents of the emails, information related to the sender or recipient that may be available to the ad server via communication with the email server or a third party service or network, such as by way of non-limiting example a social network. In one embodiment, the advertisement server 125 sends the advertisements 170 to the client device 105 when the user of the client device 105 views one or more email message cards. In one embodiment, the advertisement server 125 serves advertisements 170 to the client device 105 directly. In another embodiment, the advertisement server 125 communicates with the server 110 and transmits advertisement 170 to the server 110 for communication to the client device 105 along with or as part of the one or more email message cards.

Figure 2:
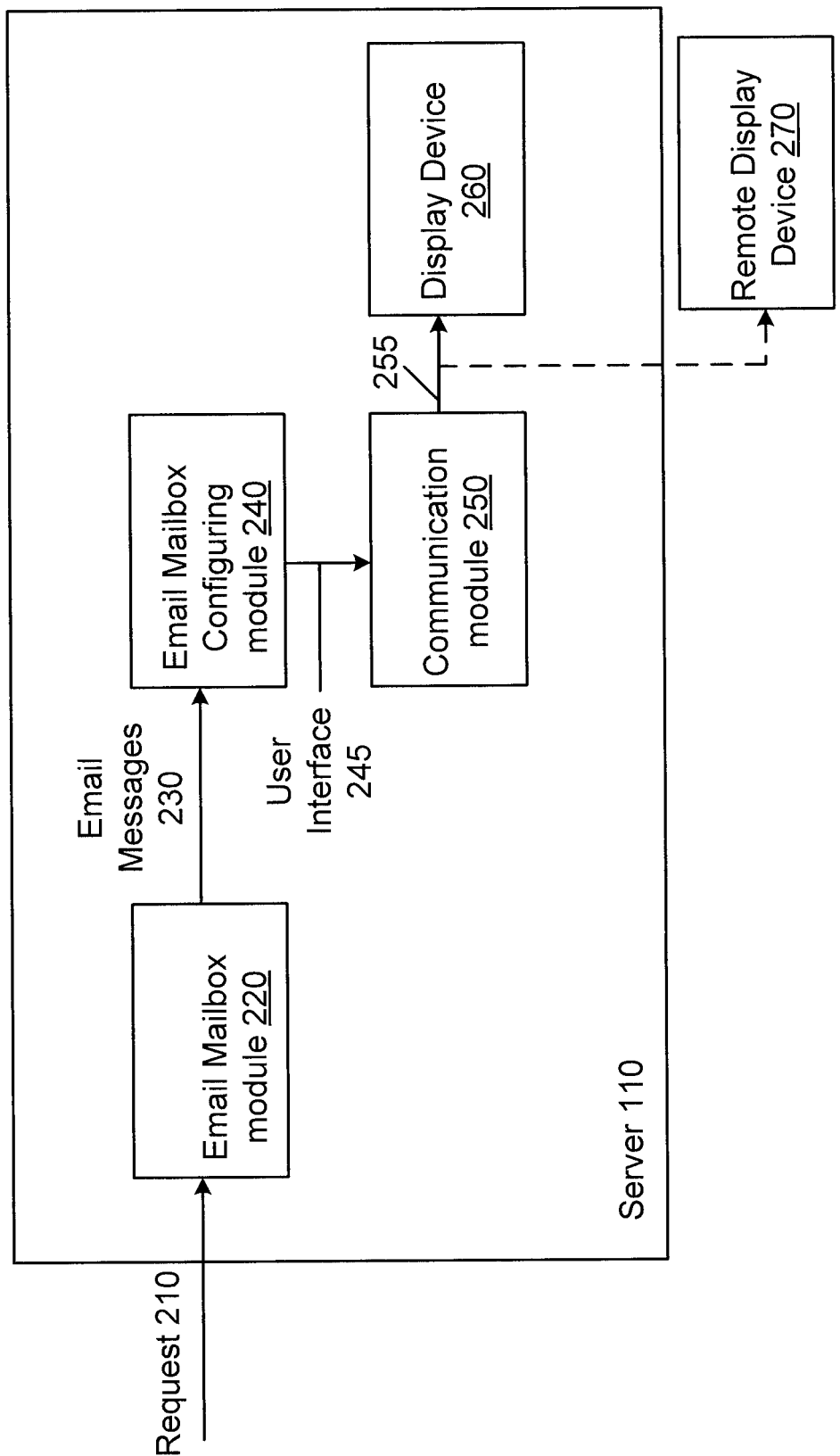
FIG. 2 is a block diagram of modules of the server computer of FIG. 1 to create a user interface including email message cards in accordance with an embodiment of the present disclosure.
Figure 3:
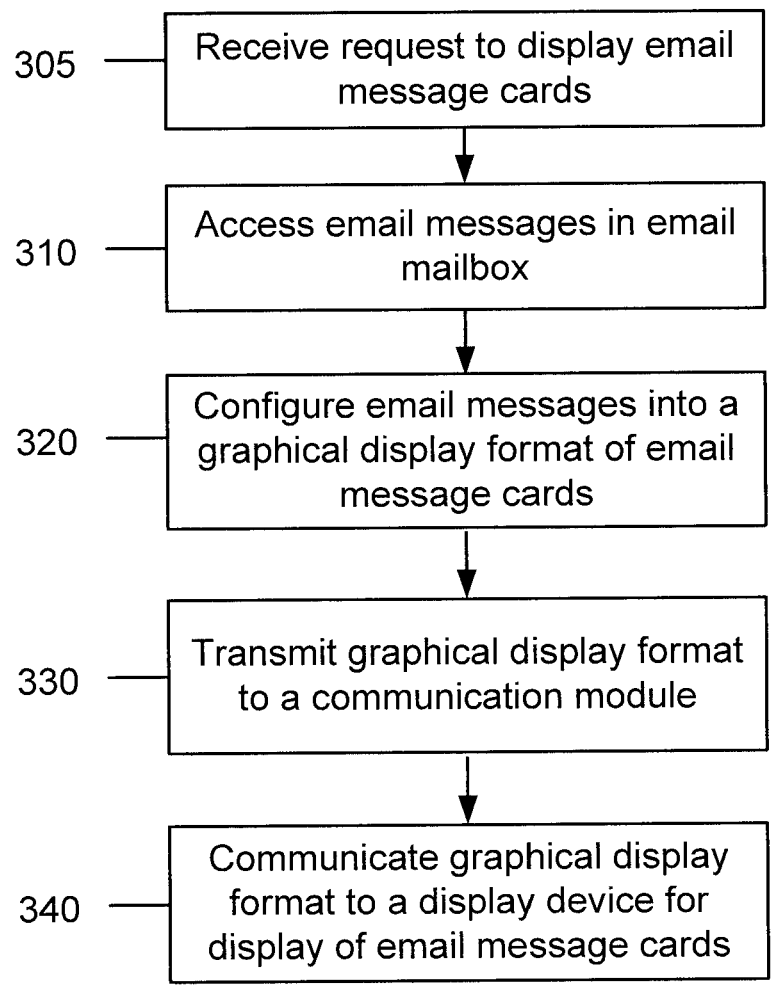
FIG. 3 is a flowchart illustrating steps performed by the server computer to create the user interface in accordance with an embodiment of the present disclosure.

FIG. 2 shows a block diagram of a computing device such as server 110 (or client device 105) for providing this email mailbox user interface with email message cards. FIG. 3 shows a flowchart illustrating steps performed by the computing device such as server 110. Although FIGS. 2 and 3 are described below as being implemented on the server computer 110, any computing device, such as client device 105, can perform these steps and can be configured in the manner shown, or such steps and/or functions in combination.

In one embodiment, the server computer 110 receives a request 210 to display email messages in an email message card format (Step 305). In one embodiment, an email mailbox module 220 receives this request 210. In one embodiment, the email mailbox module 220 accesses one or more email messages in an email mailbox (Step 310). The email mailbox module 220 transmits the one or more email messages 230 to an email mailbox configuring module 240. The email mailbox configuring module 240 configures the email messages in the email mailbox into a graphical display format (Step 320). In one embodiment, the graphical display format includes one or more email message cards. Each email message card represents a respective email message in the email mailbox and includes some or all of the email contents of the respective email message.

In one embodiment, the email mailbox configuring module 240 transmits the user interface 245 of email messages in a graphical display format (e.g., email message cards) to a communication module 250 (Step 330). The communication module 250 communicates the graphical display format 255 to a display device 260 for display of the configured message cards (Step 340). In one embodiment, the display device 260 is a display screen (e.g., computer monitor) physically attached to server 110. In another embodiment, the communication module 250 communicates the graphical display format 255 to a remote display device 270 to display the configured email message cards. For example, the remote display device 270 may be a display screen of client device 105, such as a computer monitor, television, tablet, or smartphone.

The user can enable the user interface having email message cards in a variety of manners. For example, in one embodiment the user access his or her email mailbox via a web page provided by server 110 to client device 105. In this embodiment, the user can enable the email message card user interface on the client device 105 by selecting an option on the web page associated with the user's mailbox. In another embodiment, the server downloads a client-side application (i.e., "app") or script to the client device 105, and when the user selects the client-side app (or when the script executes), the client device 105 reformats the user's email messages into email message cards. In one embodiment, the client-side app interacts with an existing email mailbox located on the client device 105. Alternatively, the client-side app can interact with an email mailbox located on the server 110.

Figure 4:
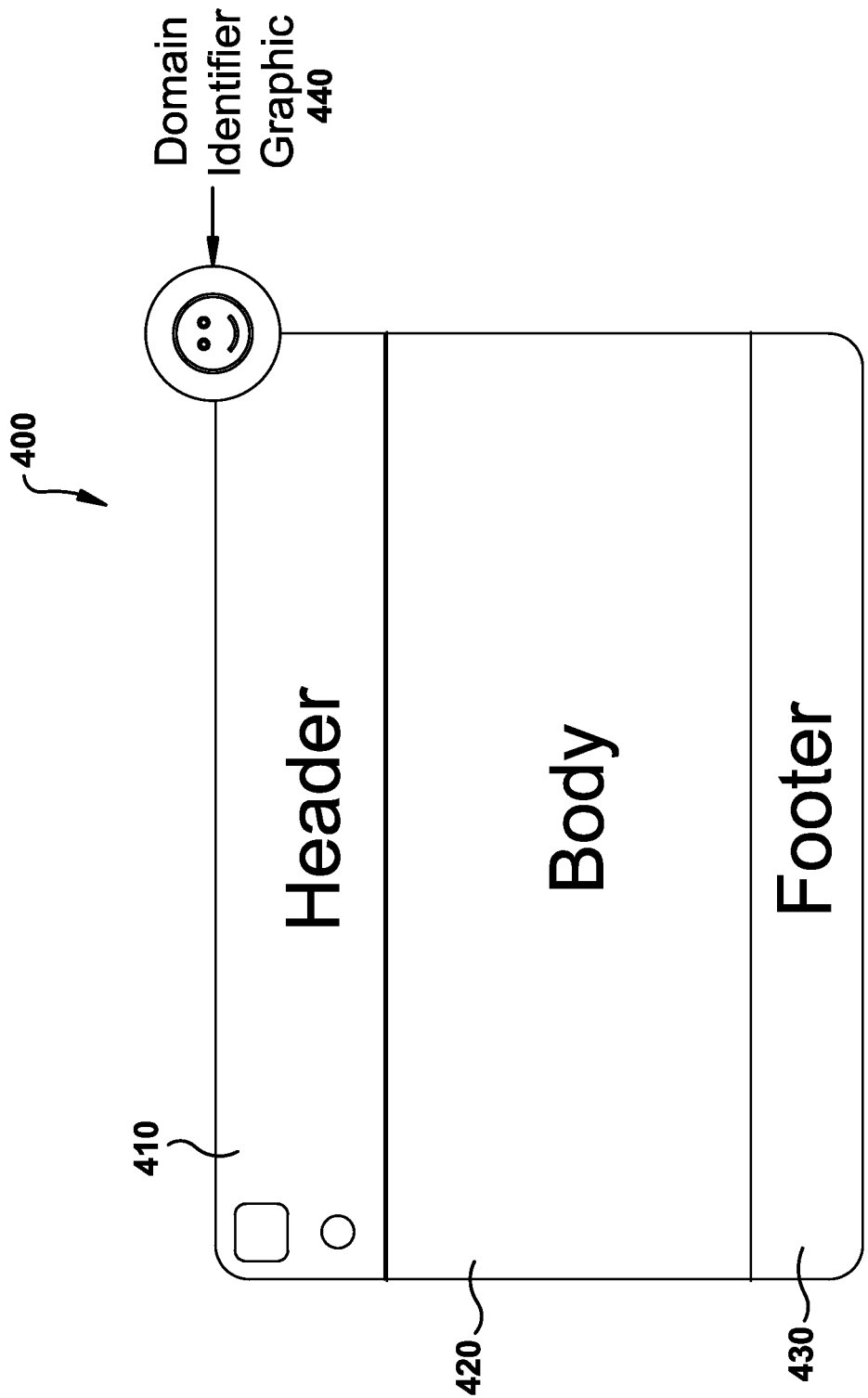
FIG. 4 is a user interface of an email message card in accordance with an embodiment of the present disclosure.

FIG. 4 is a user interface of an embodiment of an email message card 400. The email message card 400 can include a header 410, a body 420, and a footer 430. The header 410 can include information about the represented email message, such as the sender email address, the subject line, whether a message has been read or unread, etc. The body 420 can include some or all of the contents of the email message. For example, the body 420 may include the first sentence of the email text of the email message. If the user wants to see the entire email message, the user can click on the body (or, in another embodiment, any part of the email message card) to display the complete email message. In one embodiment, the footer 430 of the email message card 400 includes additional information, such as the date the message was sent and/or an indication that the message was flagged (e.g., via a star identifier). In one embodiment, the email message card 400 also includes a domain identifier graphic 440 to indicate which domain the email message was sent from.

Figure 5:
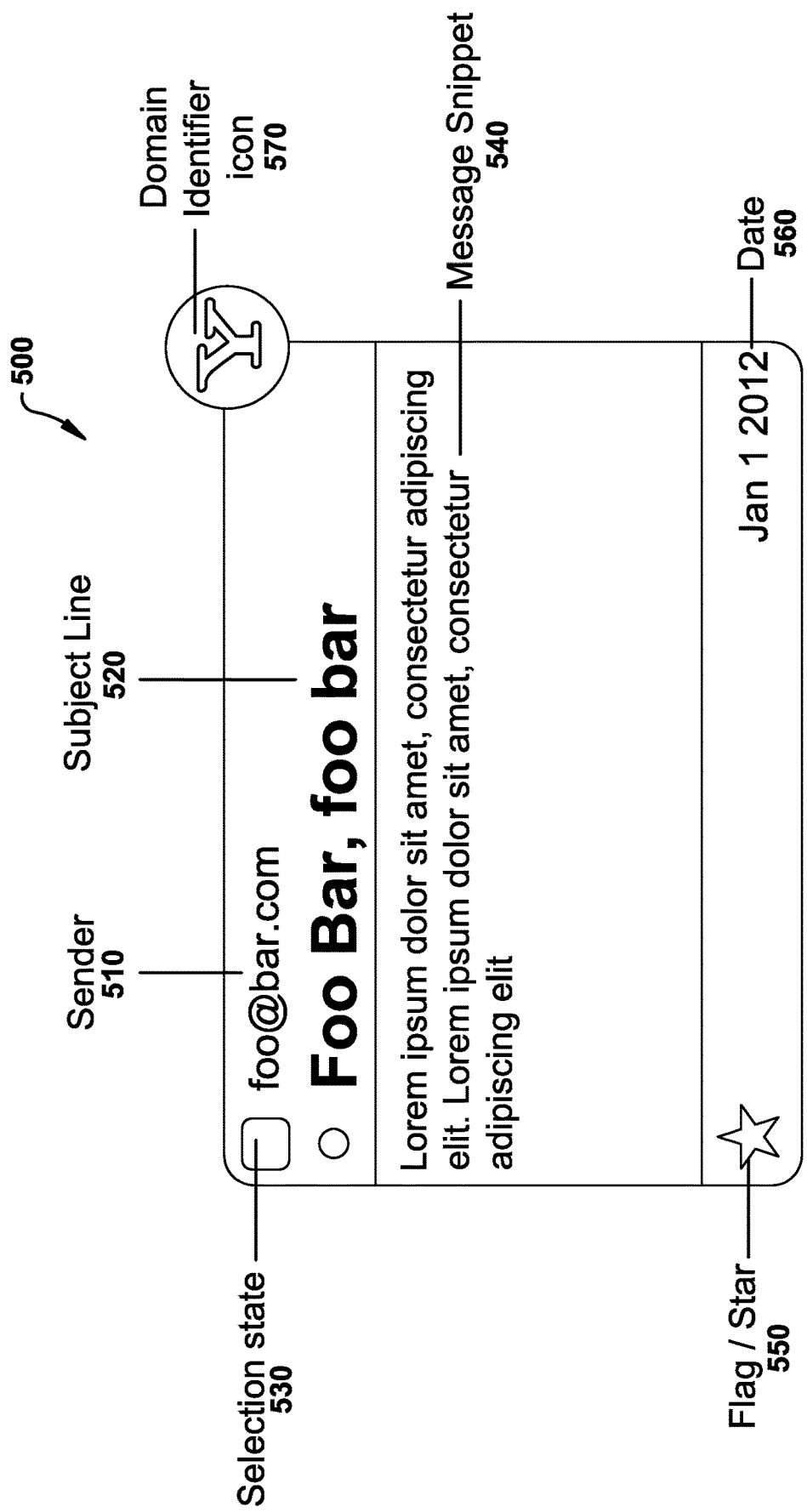
FIG. 5 is a user interface of an email message card with data in accordance with an embodiment of the present disclosure.

FIG. 5 is a user interface of an embodiment of an email message card 500 with data. The email message card 500 represents an email message sent from foo@bar.com on Jan. 1, 2012 with a subject line "foo bar". The email message card 500 displays the sender 510 and subject line 520 in the header as well as a selection state 530. The selection state 530 is a graphical representation of whether this email message card 500 has been selected by the user.

The email message card 500 also includes a message snippet 540 in the body of the message card 500. The email message card 500 may also include a star indicator 550 and date 560 in the footer. The email message card 500 also includes a domain identifier icon 570 identifying the domain that the email message was sent from (e.g., for this email message, the domain "bar.com"). In one embodiment, the server 110 or client device 105 obtains the domain from the "From:" field of an email message or the "In-ReplyTo:" header of an email message. Examples of domains in which users receive email messages include facebook.com, twitter.com, linkedin.com, yahoo.com, gmail.com, etc. In one embodiment, the server 110 maintains a white list of the known domains, such as social media domains (e.g., facebook.com), social deal domains (e.g., groupon.com), and news media agencies (e.g., yahoo.com). If an email message was sent from one of the domains on the white list, the server 110 can stamp the email message card with an icon associated with the domain.

In one embodiment, the email message card 400, 500 displays an action toolbar when the user hovers over the email message card 400, 500. The action toolbar can provide icons representing actions that a user can perform related to the email message card 400, 500, such as deleting the email message card 400, 500 (and therefore deleting the corresponding email), navigating to the previous message card in a group of message cards, navigating to the next message card in the group of message cards, opening the email message, replying to an email message, replying to all of the recipients of an email message, forwarding the email message, etc. In one embodiment, the footer of the email message card displays the action toolbar. In one embodiment, the action toolbar enables a user to perform an action on an email message via the email message card without actually opening the email message.

The format of an email message card can be predetermined or can have a format that can be changed by the user, by the email server, or via preferences detected by or communicated from a server, site, or network that maintains user preference data for or on behalf of the user of the email service. For example, a user may not want to include a footer in their email message cards. In one embodiment, the user transmits email message card format instructions from his client device 105 to the server computer 110 to configure one or more email message cards. By way of non-limiting example, the user can adjust the color, size, and/or contents of an email message card. In one embodiment, the email message cards are formatted based on the display screen size, display screen resolution, message content, size and/or type of attachment or other message, device, or user based criteria.

Figure 6:
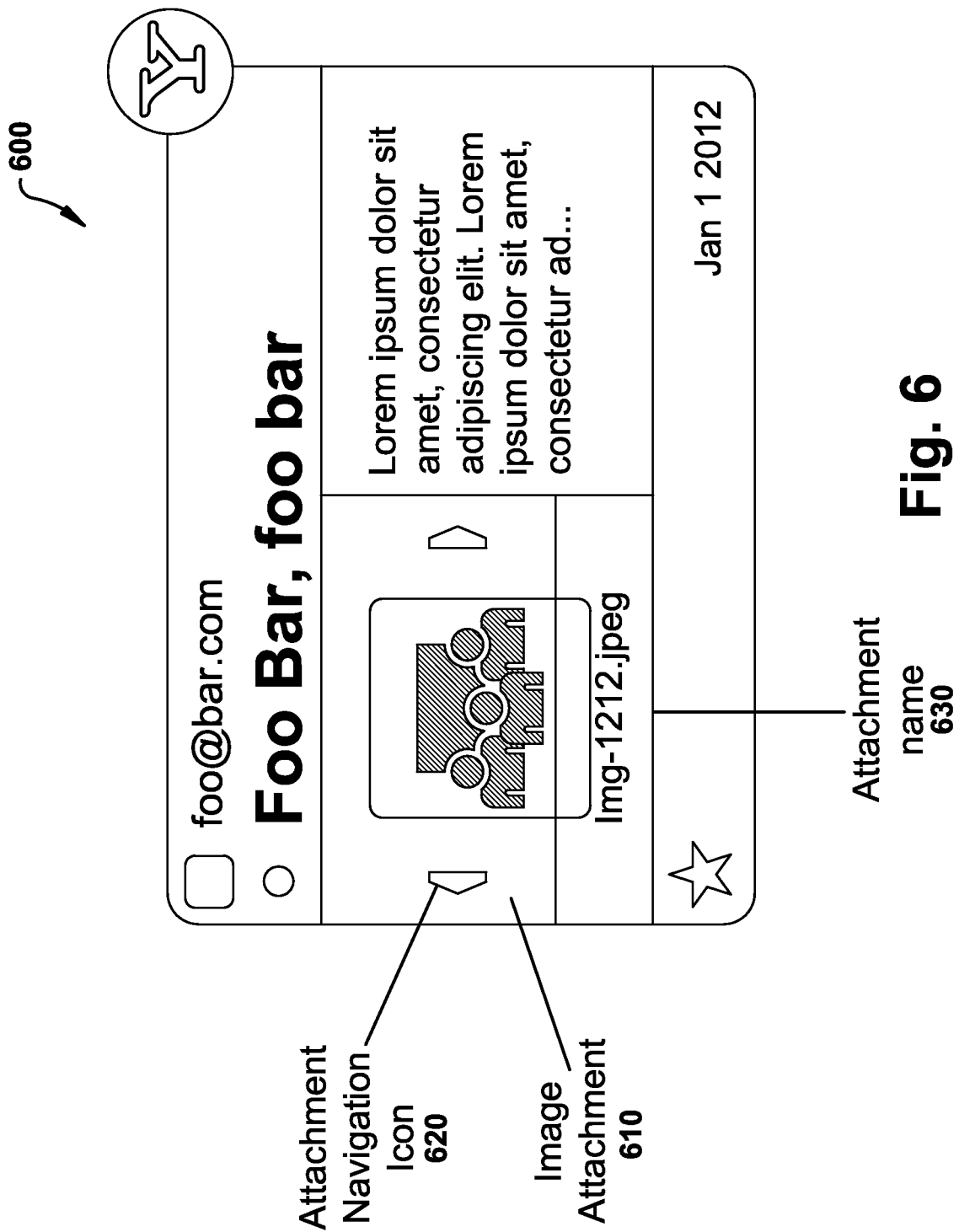
FIG. 6 is a user interface of an email message card with an attachment in accordance with an embodiment of the present disclosure.

FIG. 6 is a user interface of an embodiment of an email message card 600 that includes an attachment 610. In one embodiment, the attachment 610 is displayed as an image. The email message card 600 can also include attachment navigation icons 620 enabling the user to navigate between different attachments. An attachment name 630 may also be displayed.

Figure 7:
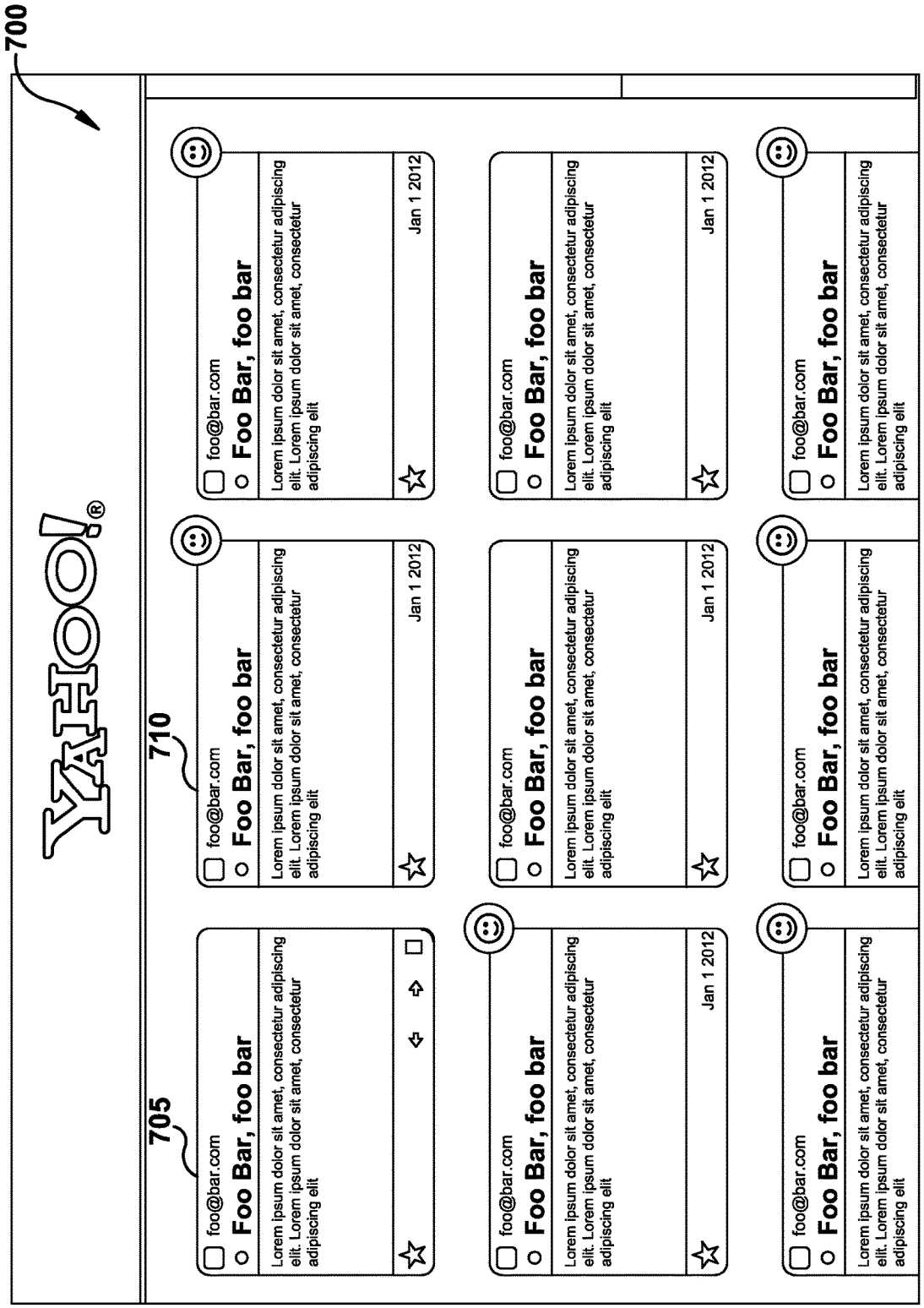
FIG. 7 is a user interface of a plurality of email message cards in accordance with an embodiment of the present disclosure.

FIG. 7 is a user interface of an embodiment of a graphical display format 700 having a plurality of email message cards (e.g., email message card 705 and email message card 710).

In one embodiment, the user configures the layout of the graphical display format 700. In one embodiment, the email message cards are displayed in a grid, with three columns and three rows. In one embodiment, the user can configure the grid layout, such as by changing the number of rows and/or columns displayed on the display device (e.g., display device 260 and/or 270). In one embodiment, the server computer 110 determines how many rows and columns to display depending on characteristics of display device such as for example screen size, available real estate, resolution, or other display characteristics. In other embodiments, the graphical display format is not displayed in a grid but is rather in some other configuration, such as displayed in a particular shape.

The graphical display format of email message cards provides a variety of advantages with respect to email messages. For example, the email message cards graphical display format enables the grouping of similar emails (e.g., stacks, lists), the performance of group actions, visual grouping cues, the identification of a domain through visual icon cues 440, and quickly glancing a message via the message's displayed snippets 540. Additionally, in one embodiment the graphical display format is consistent across different client devices (e.g., smartphone, tablet, computer, laptop, etc.).

In one embodiment, the user can create personal filters that the user can assign custom icons and/or theme colors to email message cards. The user may also be able to customize the font used, style, colors, contents, or any other criteria that can be used to format or display the email message cards. This may provide a user with quick insights into their email messages and enable the visual distinguishing of emails. Thus, in one embodiment, this facilitates the user being able to triage, navigate, and maintain their email mailbox.

Figure 8:
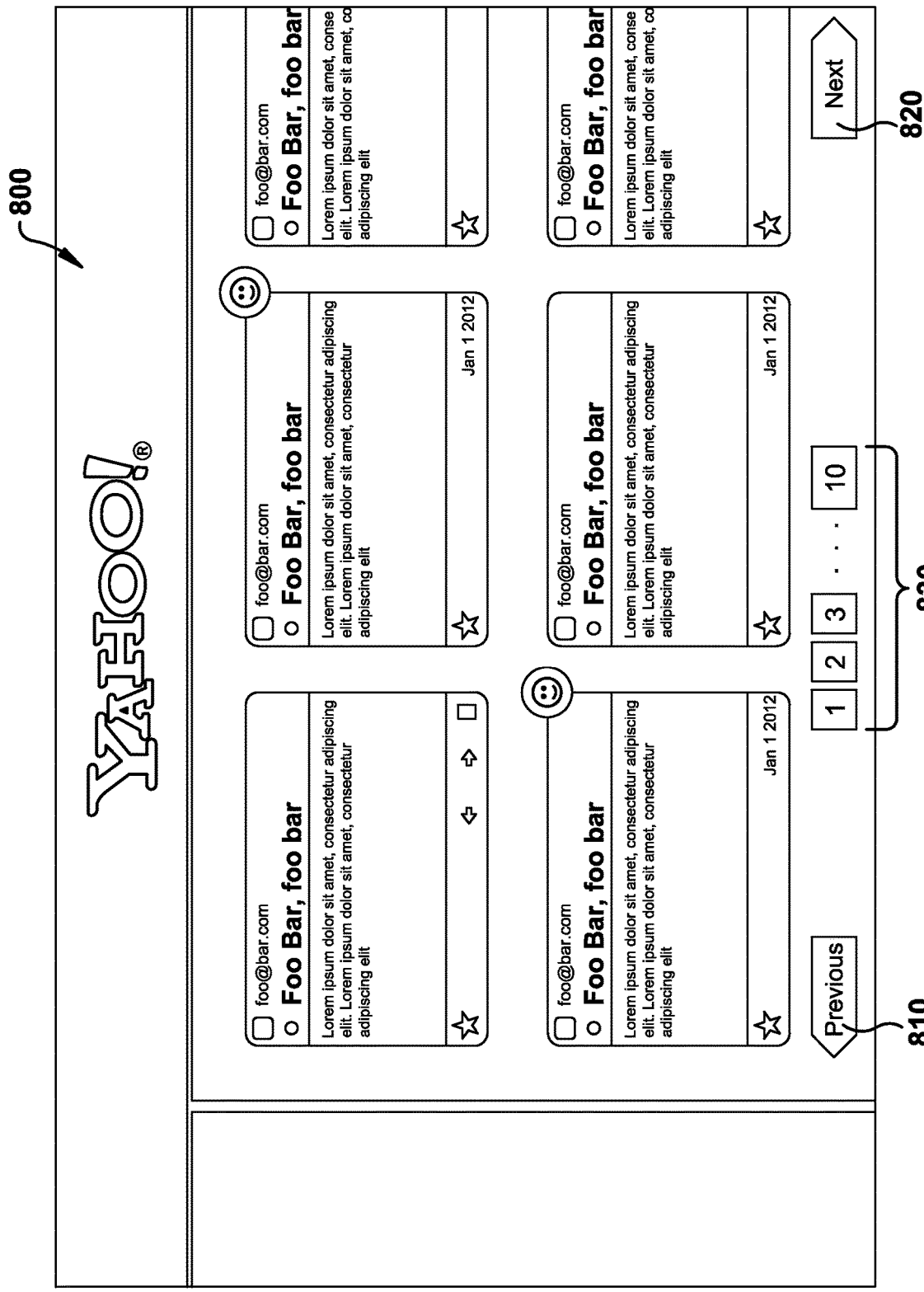
FIG. 8 is a user interface having pagination buttons enabling a user to navigate to a previous page of email message cards or to navigate to a next page of email message cards in accordance with an embodiment of the present disclosure.

FIG. 8 is a user interface of an embodiment of a graphical display format 800 having pagination buttons 810, 820 enabling a user to navigate to a previous page (with previous button 810) of email message cards or to navigate to a next page (with next button 820) of email message cards. Graphical display format 800 can also include page buttons 830 enabling the user to navigate to different pages of email message cards. In one embodiment, the client device 105 detects the selection of a pagination button 810, 820 or page button 830 by the user. In response to the detection of one of these buttons 810, 820, 830, the client device 105 displays the selected page of the email message cards.

Figure 9:
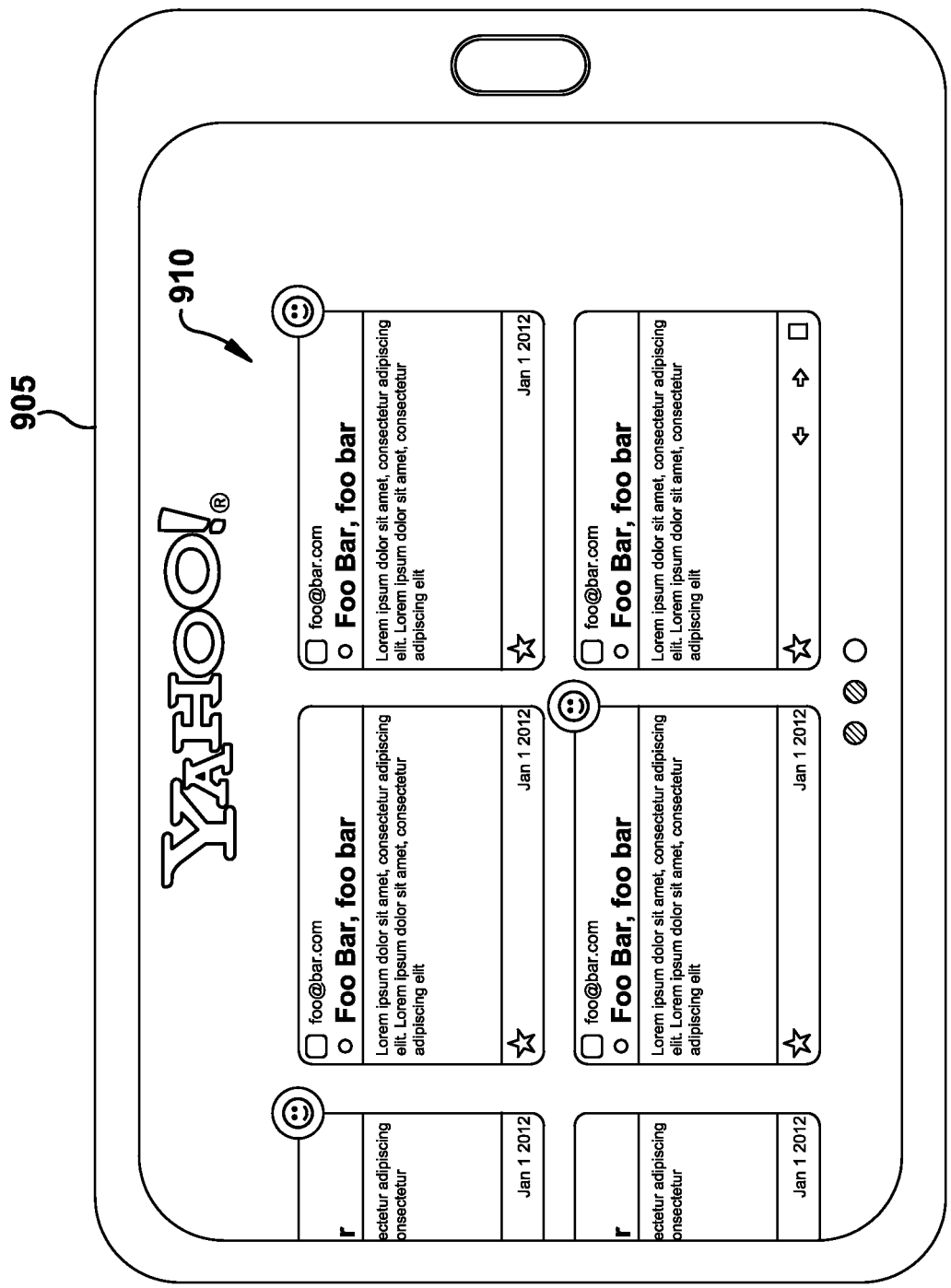
FIG. 9 is a user interface of email message cards displayed on a tablet computer in accordance with an embodiment of the present disclosure.

FIG. 9 is a user interface displayed on, for example, a tablet computer 905 of an embodiment of a graphical display format 910. In one embodiment, the tablet computer 905 is a client device that detects a "swipe" motion made on the screen of the tablet computer 905 by the user. The user typically uses his or her finger to swipe in a particular direction. For example, if the user wants to view the email message cards on the previous page, the user can use his finger to swipe the screen to the right (or left). This results in the tablet computer 905 displaying the previous page. Similarly, if the user swipes the screen to the left (or right), the next page is displayed. The user typically swipes horizontally to the left or the right on tablet computer 905. In one embodiment, the action toolbar is displayed when the user selects (e.g., touches) an email message card displayed by the table computer 905.

Figure 10:
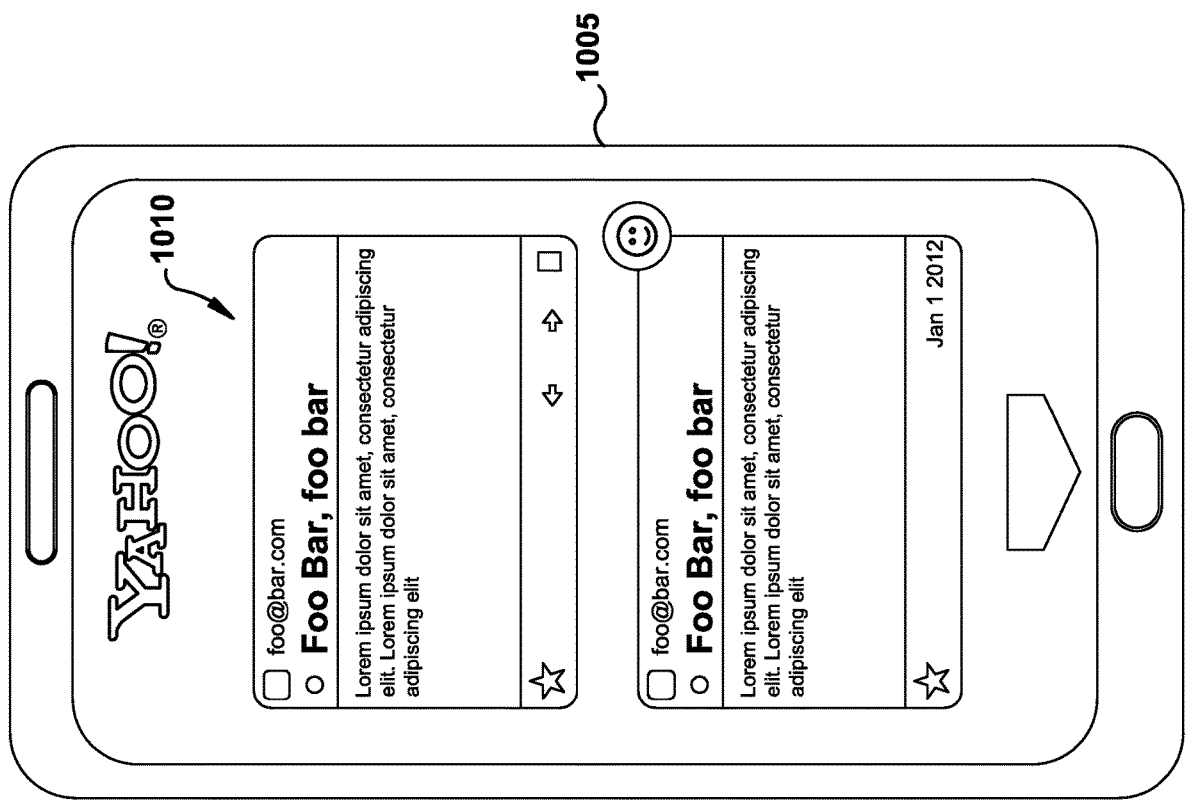
FIG. 10 is a user interface of email message cards displayed on a mobile smartphone in accordance with an embodiment of the present disclosure.

FIG. 10 is a user interface displayed on a mobile smartphone 1005 of an embodiment of a graphical display format 1010. In one embodiment, the mobile smartphone 1005 detects a user swipe to change the email message cards displayed in the graphical display format 1010. In one embodiment, the user swipes vertically (i.e., up or down) to change the display. In one embodiment, the action toolbar is displayed when the user selects (e.g., touches) an email message card displayed by the mobile smartphone 1005.

Figure 11:
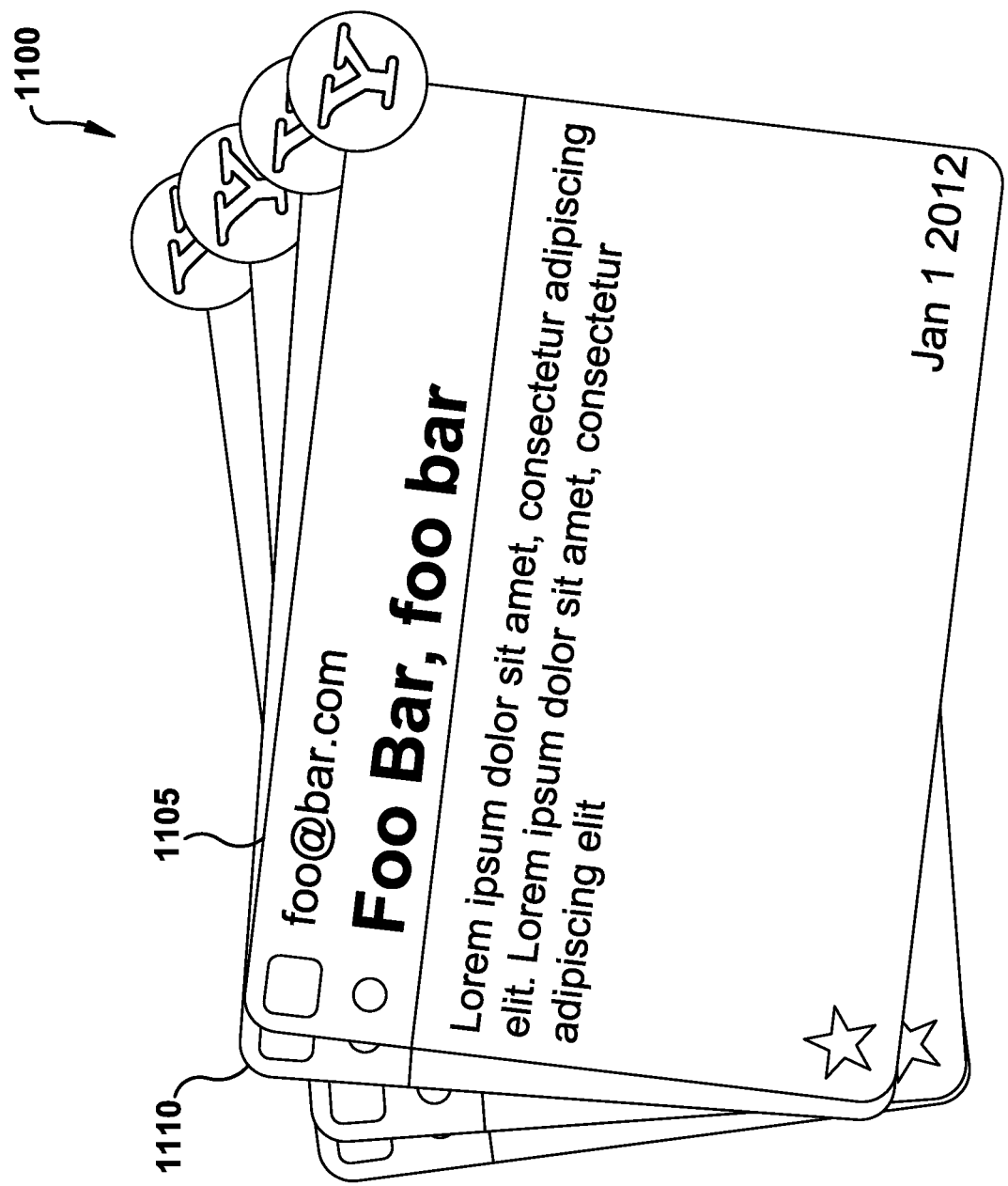
FIG. 11 is a user interface displayed with a stack of email message cards in accordance with an embodiment of the present disclosure.
Figure 12:
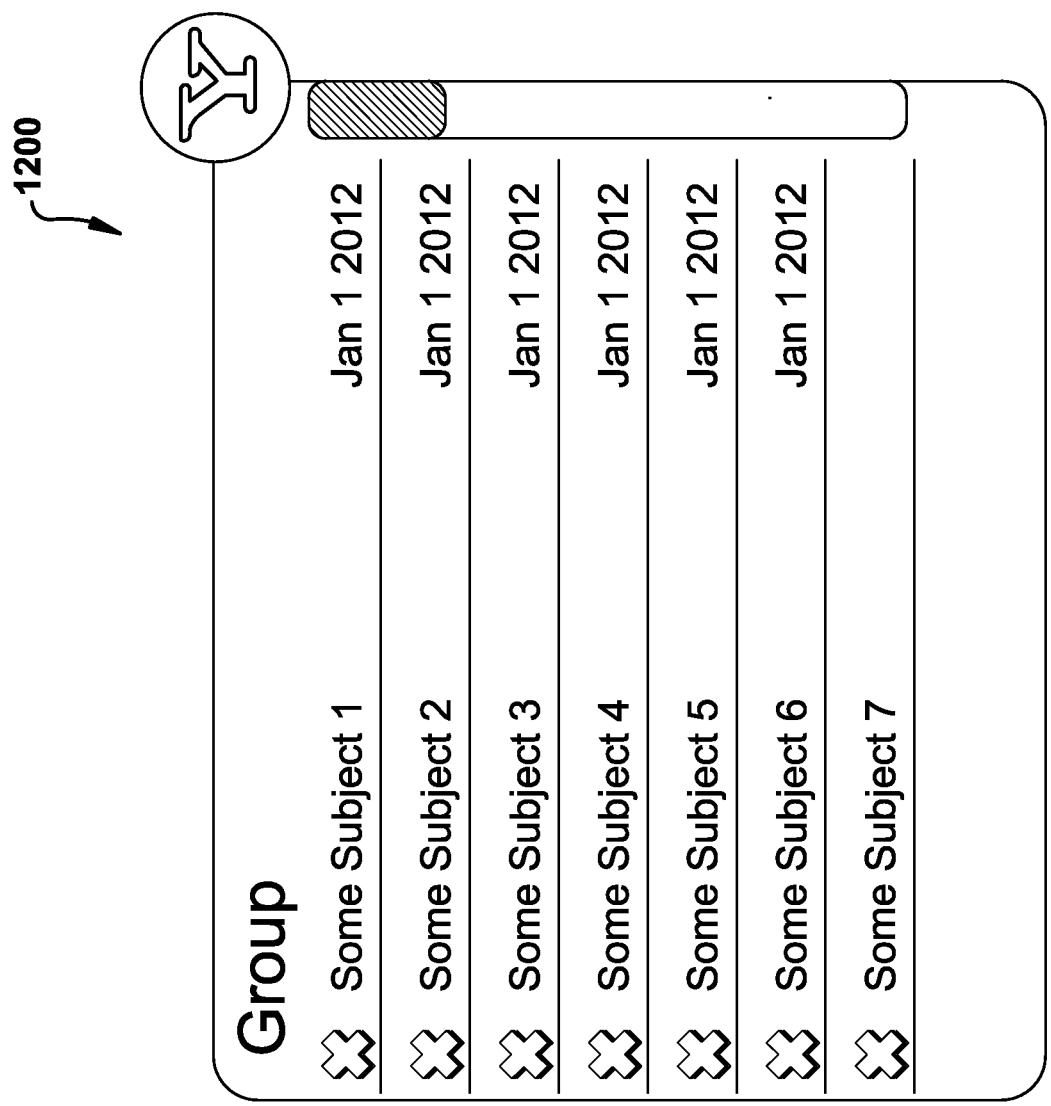
FIG. 12 is a user interface displayed with a list of email message cards in accordance with an embodiment of the present disclosure.

FIG. 11 is a user interface of an embodiment of a graphical display format 1100 with stacks of email message cards. Specifically, in one embodiment the email message cards such as email message card 1105 and 1110 are displayed as a stack. The user may select this view 1100 when, for example, the user has grouped together several email message cards. The user may want to view the group in a stack to enable quick perusal of the email message cards in the group. In another embodiment and referring to FIG. 12, the email message cards are displayed in a group list 1200 to enable the user to view email message cards in a list format.

Although described herein with respect to email messages, the message card user interface can alternatively or additionally be configured to display other content, such as text messages, software documents, web pages, software programs, instant messages, voicemails, etc. The message card user interface can display various information related to this other content, such as URL of a web page, snippet of web page contents, graphics of the web page, etc. for a web page or web site, telephone number and contents for a text message, program and content for a software document (e.g., a Microsoft® Word® document), etc. In one embodiment, the user can customize the software cards in any desired manner, such as customizing the color, layout, contents, style, font used, etc.

Figure 13:
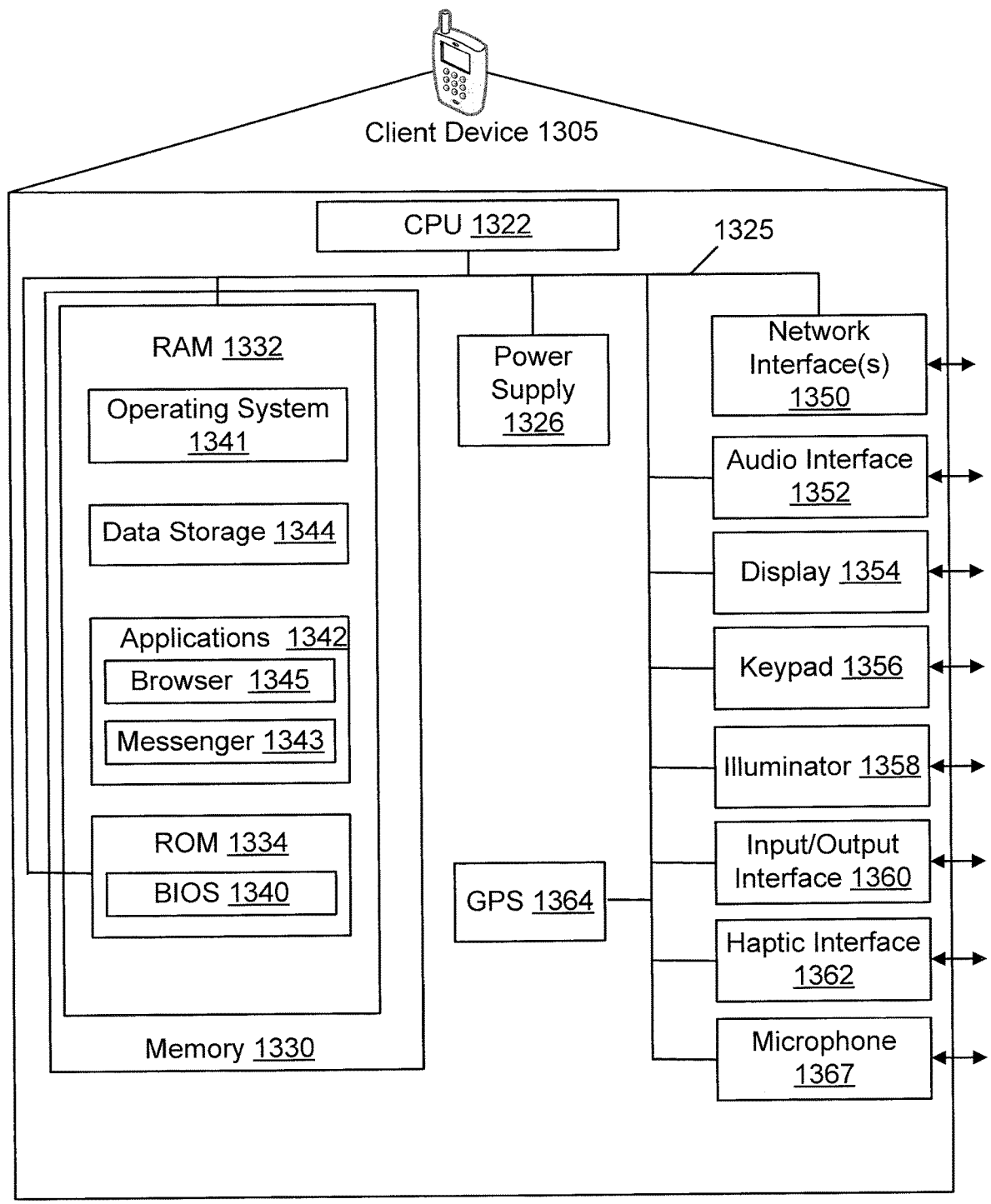
FIG. 13 is a block diagram of components of a client device in accordance with an embodiment of the present disclosure.

FIG. 13 shows one example of a schematic diagram illustrating a client device 1305 (e.g., client device 105). Client device 1305 may include a computing device capable of sending or receiving signals, such as via a wired or wireless network. A client device 1305 may, for example, include a desktop computer or a portable device, such as a cellular telephone, a smartphone, a display pager, a radio frequency (RF) device, an infrared (IR) device, a Personal Digital Assistant (PDA), a handheld computer, a tablet computer, a laptop computer, a digital camera, a set top box, a wearable computer, an integrated device combining various features, such as features of the foregoing devices, or the like.

The client device 1305 may vary in terms of capabilities or features. Claimed subject matter is intended to cover a wide range of potential variations. For example, a cell phone may include a numeric keypad or a display of limited functionality, such as a monochrome liquid crystal display (LCD) for displaying text, pictures, etc. In contrast, however, as another example, a web-enabled client device may include one or more physical or virtual keyboards, mass storage, one or more accelerometers, one or more gyroscopes, global positioning system (GPS) or other location-identifying type capability, of a display with a high degree of functionality, such as a touch-sensitive color 2D or 3D display, for example.

A client device 1305 may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, or Google+®, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

As shown in the example of FIG. 13, client device 1305 may include one or more processing units (also referred to herein as CPUs) 1322, which interface with at least one computer bus 1325. A memory 1330 can be persistent storage and interfaces with the computer bus 1325. The memory 1330 includes RAM 1332 and ROM 1334. ROM 1334 includes a BIOS 1340. Memory 1330 interfaces with computer bus 1325 so as to provide information stored in memory 1330 to CPU 1322 during execution of software programs such as an operating system 1341, application programs 1342, device drivers, and software modules 1343, 1345 that comprise program code, and/or computer-executable process steps, incorporating functionality described herein, e.g., one or more of process flows described herein. CPU 1322 first loads computer-executable process steps from storage, e.g., memory 1332, data storage medium/media 1344, removable media drive, and/or other storage device. CPU 1322 can then execute the stored process steps in order to execute the loaded computer-executable process steps. Stored data, e.g., data stored by a storage device, can be accessed by CPU 1322 during the execution of computer-executable process steps.

Persistent storage medium/media 1344 is a computer readable storage medium(s) that can be used to store software and data, e.g., an operating system and one or more application programs. Persistent storage medium/media 1344 can also be used to store device drivers, such as one or more of a digital camera driver, monitor driver, printer driver, scanner driver, or other device drivers, web pages, content files, playlists and other files. Persistent storage medium/media 1344 can further include program modules and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Client device 1305 can also include one or more of a power supply 1326, network interface 1350, audio interface 1352, a display 1354 (e.g., a monitor or screen), keypad 1356, illuminator 1358, I/O interface 1360, a haptic interface 1362, a GPS 1364, a microphone 1367, a video camera, TV/radio tuner, audio/video capture card, sound card, analog audio input with A/D converter, modem, digital media input (HDMI, optical link), digital I/O ports (RS232, USB, FireWire, Thunderbolt), expansion slots (PCMCIA, ExpressCard, PCI, PCIe).

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Figure 14:
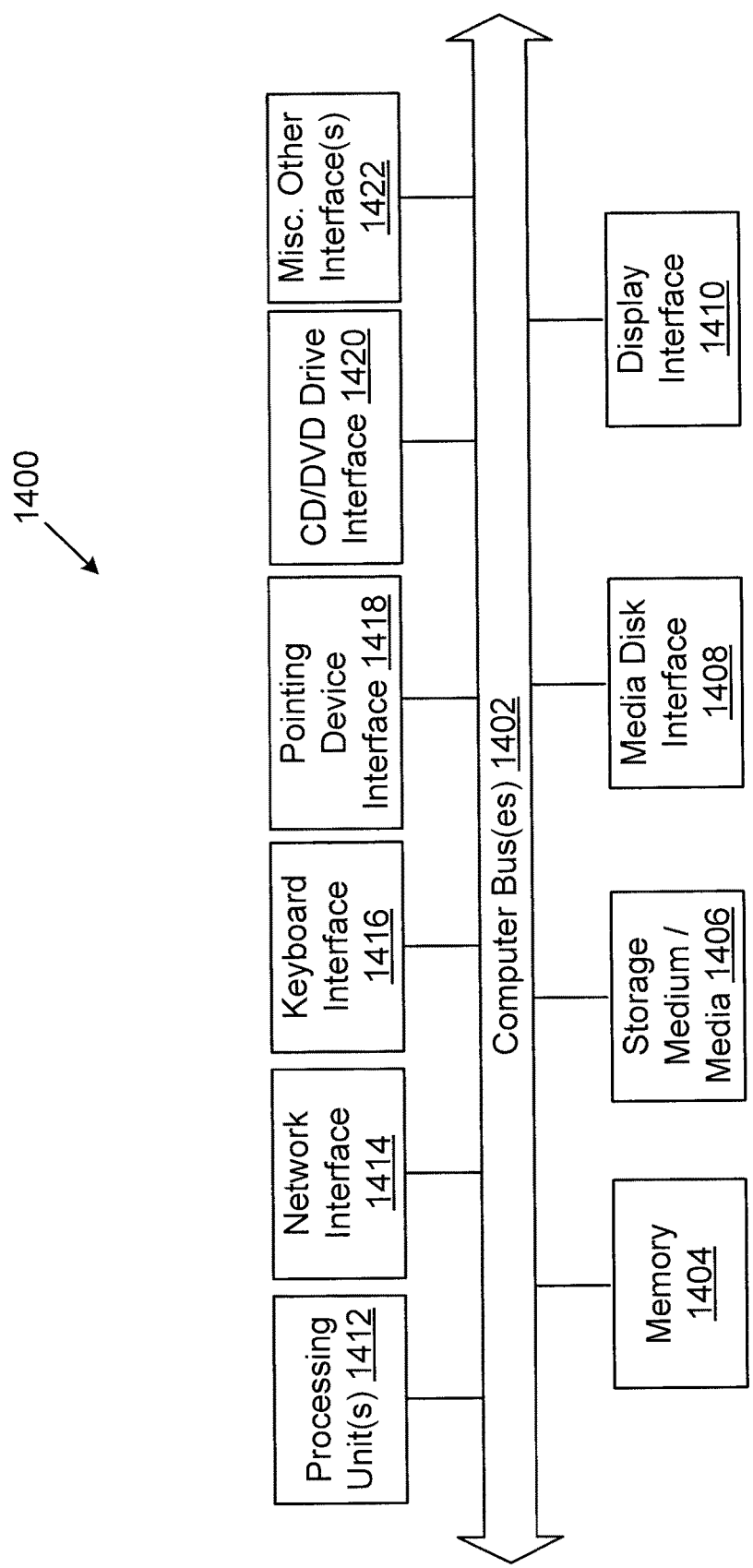
FIG. 14 is a block diagram illustrating an internal architecture of a computer in accordance with an embodiment of the present disclosure.

FIG. 14 is a block diagram illustrating an internal architecture of an example of a computer, such as server 110 and/or client device 105 in accordance with one or more embodiments of the present disclosure. A computer as referred to herein refers to any device with a processor capable of executing logic or coded instructions, and could be a server, personal computer, set top box, tablet, smartphone, pad computer or media device, to name a few such devices. As shown in the example of FIG. 14, internal architecture 1400 includes one or more processing units (also referred to herein as CPUs) 1412, which interface with at least one computer bus 1402. Also interfacing with computer bus 1402 are persistent storage medium/media 1406, network interface 1414, memory 1404, e.g., random access memory (RAM), run-time transient memory, read only memory (ROM), etc., media disk drive interface 1408 as an interface for a drive that can read and/or write to media including removable media such as floppy, CD-ROM, DVD, etc. media, display interface 1410 as interface for a monitor or other display device, keyboard interface 1416 as interface for a keyboard, pointing device interface 1418 as an interface for a mouse or other pointing device, and miscellaneous other interfaces not shown individually, such as parallel and serial port interfaces, a universal serial bus (USB) interface, and the like.

Memory 1404 interfaces with computer bus 1402 so as to provide information stored in memory 1404 to CPU 1412 during execution of software programs such as an operating system, application programs, device drivers, and software modules that comprise program code, and/or computer-executable process steps, incorporating functionality described herein, e.g., one or more of process flows described herein. CPU 1412 first loads computer-executable process steps from storage, e.g., memory 1404, storage medium/media 1406, removable media drive, and/or other storage device. CPU 1412 can then execute the stored process steps in order to execute the loaded computer-executable process steps. Stored data, e.g., data stored by a storage device, can be accessed by CPU 1412 during the execution of computer-executable process steps.

As described above, persistent storage medium/media 1406 is a computer readable storage medium(s) that can be used to store software and data, e.g., an operating system and one or more application programs. Persistent storage medium/media 1406 can also be used to store device drivers, such as one or more of a digital camera driver, monitor driver, printer driver, scanner driver, or other device drivers, web pages, content files, playlists and other files. Persistent storage medium/media 1406 can further include program modules and data files used to implement one or more embodiments of the present disclosure.

Internal architecture 1400 of the computer can include (as stated above), a microphone, video camera, TV/radio tuner, audio/video capture card, sound card, analog audio input with A/D converter, modem, digital media input (HDMI, optical link), digital I/O ports (RS232, USB, FireWire, Thunderbolt), and/or expansion slots (PCMCIA, Express-Card, PCI, PCIe).

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the user computing device or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A computing device comprising:
   a processor; and
   a non-transitory computer-readable storage medium for tangibly storing thereon program logic for execution by the processor, the program logic comprising:
   email mailbox logic for accessing a plurality of email messages in an email mailbox;
   email mailbox configuring logic executed by the processor for configuring the email messages in the email mailbox into a graphical display format, the display format comprising email message cards, each email message card representing a respective email message in the mailbox and comprising a portion of email contents of the email message;
   email sender detection logic for detecting a domain of an email message of the plurality and associating a domain identifier icon to an email message card associated with the email message, the associating of the domain identifier icon occurring upon determining that the domain is on a white list of domains, said association causing the domain identifier icon to be displayed within the email message card;
   email message card configuration receiving logic executed by the processor for receiving a user configuration of each email message card;
   display logic executed by the processor for configuring the graphical display format such that message cards with the same domain icon are grouped within a portion of the graphical display format; and
   communication logic executed by the processor for communicating the graphical display format to a display device, said communication causing each configured message card to be modified to persistently display an action toolbar within each configured message card, each action toolbar displayed within a respective configured message card comprising functionality that enables interaction with content of an associated email message without opening the respective email message and without opening the respective configured message card, said enabled interaction occurring through interaction with the displayed action toolbar.

2. The computing device of claim 1, wherein the communication logic is further configured to communicate to a remote device comprising the display device.

3. The computing device of claim 1, wherein each email message card comprises sender information, a subject line, and a selection state.

4. The computing device of claim 1, wherein the portion of the email contents comprises the entire email message.

5. The computing device of claim 1, further comprising logic for detecting a pagination command, the detecting causing display of different email message cards.

6. The computing device of claim 1, wherein the email mailbox configuring logic further comprising stack configuring logic executed by the processor for configuring the email messages in the email mailbox into a graphical display format, the display format comprising email message cards arranged in a stack configuration.

7. The computing device of claim 1, further comprising receiving logic executed by the processor for receiving, from the display device, an enablement signal to enable the graphical display format.

8. A method comprising:
   accessing, by a computing device, a plurality of email messages in an email mailbox;
   configuring, by the computing device, the email messages in the email mailbox into a graphical display format, the display format comprising email message cards, each email message card representing a respective email message in the mailbox and comprising a portion of email contents of the email message;
   detecting, by the computing device, a domain of an email message of the plurality and associating a domain identifier icon to an email message card associated with the email message, the associating of the domain identifier icon occurring upon determining that the domain is on a white list of domains, said association causing the domain identifier icon to be displayed within the email message card;
   receiving, by the computing device, a user configuration of each email message card;
   configuring, by the computing device, the graphical display format such that message cards with the same domain icon are grouped within a portion of the graphical display format; and communicating, by the computing device, the graphical display format to a display device, said communication causing each configured message card to be modified to persistently display an action toolbar within each configured message card, each action toolbar displayed within a respective configured message card comprising functionality that enables interaction with content of an associated email message without opening the respective email message and without opening the respective configured message card, said enabled interaction occurring through interaction with the displayed action toolbar.

9. The method of claim 8, further comprising detecting, by the computing device, a pagination command, the detecting causing display of different email message cards.

10. The method of claim 8, wherein the configuring further comprising configuring, by the computing device, the email messages in the email mailbox into a graphical display format, the display format comprising email message cards arranged in a stack configuration.

11. The method of claim 8, further comprising receiving, from the display device, an enablement signal to enable the graphical display format.

12. A non-transitory computer readable storage medium tangibly storing computer program instructions that when executed by a processor or a computing device, cause the computing device to perform a method comprising:

accessing, by the computer processor, a plurality of email messages in an email mailbox;

configuring, by the computer processor, the email messages in the email mailbox into a graphical display format, the display format comprising email message cards, each email message card representing a respective email message in the mailbox and comprising a portion of email contents of the email message;

detecting, by the computer processor, a domain of an email message of said plurality and associating a domain identifier icon to an email message card associated with the email message, the associating of the domain identifier icon occurring upon determining that the domain is on a white list of domains, said association causing the domain identifier icon to be displayed within the email message card;

receiving, by the computer processor, a user configuration of each email message card;

configuring, by the computer processor, the graphical display format such that message cards with the same domain icon are grouped within a portion of the graphical display format; and communicating, by the computer processor, the graphical display format to a display device, said communication causing each configured message card to be modified to persistently display an action toolbar within each configured message card, each action toolbar displayed within a respective configured message card comprising functionality that enables interaction with content of an associated email message without opening the respective email message and without opening the respective configured message card, said enabled interaction occurring through interaction with the displayed action toolbar.

* * * * *